United States Patent [19]

Yamashita

[11] Patent Number: 5,473,544
[45] Date of Patent: Dec. 5, 1995

[54] SLIP CONTROL SYSTEM FOR AN AUTOMOTIVE VEHICLE

[75] Inventor: Tetsuhiro Yamashita, Hiroshima, Japan

[73] Assignee: Mazda Motor Corporation, Hiroshima, Japan

[21] Appl. No.: 115,657

[22] Filed: Sep. 3, 1993

[30] Foreign Application Priority Data

Sep. 3, 1992 [JP] Japan .................. 4-263068

[51] Int. Cl.$^6$ .................. B60T 8/00
[52] U.S. Cl. .............. 364/426.03; 180/197; 123/416; 123/417
[58] Field of Search ............ 364/426.02, 426.03, 364/426.01, 424.1; 180/197; 123/417, 416

[56] References Cited

U.S. PATENT DOCUMENTS

| | | | |
|---|---|---|---|
| 5,155,686 | 10/1992 | Shiraishi et al. | 364/426.03 |
| 5,168,952 | 12/1992 | Oono et al. | 180/197 |
| 5,198,982 | 3/1993 | Kobayashi | 364/426.02 |
| 5,201,383 | 4/1993 | Kitagawa et al. | 180/197 |
| 5,213,178 | 5/1993 | Polidan et al. | 180/197 |
| 5,216,608 | 6/1993 | Ito et al. | 364/426.03 |
| 5,224,044 | 6/1993 | Tamura et al. | 364/426.03 |
| 5,241,478 | 8/1993 | Inoue et al. | 364/426.02 |
| 5,265,693 | 11/1993 | Rees et al. | 364/426.01 |
| 5,291,965 | 3/1994 | Takata | 180/197 |

FOREIGN PATENT DOCUMENTS

| | | |
|---|---|---|
| 60-104730 | 6/1985 | Japan . |
| 1-197160 | 8/1989 | Japan . |

*Primary Examiner*—Kevin J. Teska
*Assistant Examiner*—Stephen J. Walder, Jr.
*Attorney, Agent, or Firm*—Fish & Richardson

[57] ABSTRACT

A slip control or a traction control is performed by retarding the timing of ignition or cutting the supply of fuel to the partial number of the cylinders when a slip of the driving wheel with respect to the surface of a road becomes excessive. When the number of revolutions of the engine becomes higher than a given value, for example, 6,500 rpm, prior to starting the traction control, the start of the traction control is inhibited. When the number of engine revolutions becomes higher than the given value during the traction control, the traction control is suspended and a particular control is executed. The particular control includes, for example, a control to be performed by repeating an action to cut the supply of fuel to all cylinders and an action to supply fuel to all cylinders. The particular control can satisfy a prevention of the driving wheels from slipping and a prevention of a catalyst for purifying exhaust gases from becoming too high in temperature.

21 Claims, 8 Drawing Sheets

SLIP CONTROL SYSTEM FOR AN AUTOMOTIVE VEHICLE

BACKGROUND OF THE INVENTION

1. Field of the Invention

The present invention relates to a slip control system for an automotive vehicle and, more particularly, to a slip control system for an automotive vehicle so adapted as to improve a traction control of an internal combustion engine particularly when the internal combustion engine rotates at a speed higher than a given value.

2. Description of the Related Art

Heretofore, there is commercially available a traction control technology that can control an engine output and braking force to be applied to wheels (reduce the engine output or increase the braking force) by detecting an amount of a slip of a driving wheel and making the detected slip amount a target value, in order to prevent acceleration from reducing by causing the driving wheels to slip due to an excessive amount of driving torque at the time when the vehicle is being accelerated (for example, Japanese Patent Unexamined Publication (kokai) No. 1-197,160). A large number of vehicles are provided with a such traction control system and an anti-skid control system.

For the technology of performing the traction control of the internal combustion engine for suppressing a slip of the vehicle, there are generally used actions to retard a timing of ignition and cutting the supply of fuel to a partial number of cylinders as means for restricting the engine output in order to control a slip of the vehicle.

Japanese Patent Unexamined Publication (kokai) No. 60-104,730 discloses a slip control system for an automotive vehicle which is so arranged as to cut the supply of fuel to an entire number of the cylinders when a number of revolutions of the engine becomes higher than a given reference number during the traction control of the engine.

When the number of revolutions of the engine is not high, no problems may arise even if the timing of ignition would be retarded and the supply of fuel to the partial number of the cylinders would be cut in order to perform the traction control. On the other hand, however, when the timing of ignition is retarded at the time of the high number of revolutions of the engine, combustibility of the fuel in the combustion of the engine becomes so poor that unburned fuel is caused to burn strongly in a catalyst unit disposed in the exhaust system, thereby proceeding in deterioration of the catalyst unit due to overheating. Further, if the supply of fuel to the partial number of the cylinders would be cut at the time of the high number of revolutions of the engine, the concentration of oxygen in exhaust gases becomes so high that the combustion of the fuel is accelerated in the catalyst unit, thereby inducing deterioration of the catalyst unit.

SUMMARY OF THE INVENTION

The object of the present invention is to provide a slip control system for an automotive vehicle so adapted as to prevent problems from occurring on account of the traction control at the time of a high number of revolutions of the engine.

In order to achieve the object as described hereinabove, the present invention consists of a slip control system for an automotive vehicle, comprising:

a slip amount detecting means for detecting an amount of a slip of a driving wheel with respect to the surface of a road;

an output adjusting means for adjusting a factor exerting an influence upon ignition timing of an internal combustion engine;

a rpm detecting means for detecting a number of revolutions of the engine;

an ignition timing control means for controlling said output adjusting means to thereby prevent the slip amount detected by said slip amount detecting means from becoming excessive; and an inhibition means for inhibiting control by said ignition timing control means at the time when the number of revolutions of the engine to be detected by said rpm detecting means is equal to or higher than a given number of revolutions of the engine.

The traction control by the ignition timing adjusting means, that is, the control over a decrease in the output of the internal combustion engine so as to prevent an amount of a slip of the driving wheel from becoming excessive, is performed, for example, by at least one of retarding the timing of ignition and cutting the supply of fuel to the partial number of the cylinders.

The inhibition means is so adapted as to inhibit the start of the traction control when the engine becomes in such a state of rotating at a high speed before the start of the traction control.

Further, the inhibition means is so arranged as to immediately terminate the traction control when the engine becomes in such a state of rotating at a high speed during the traction control. In this case, a particular control is performed so as to prevent the temperature of a catalyst for purifying exhaust gases from becoming high, while performing the control for reducing the engine output, in place of the traction control. The particular control may include a control to be performed by repeating the actions to cut the supply of fuel to the entire number of cylinders and to supply the fuel thereto. This particular control can be terminated regardless of the number of revolutions of the engine after it has been continued for a given period of time.

The other objects, features and advantages of the present invention will become apparent in the course of the description of the preferred embodiments, which follows, with reference to the accompanying drawings.

DESCRIPTION OF THE PREFERRED EMBODIMENTS

The present invention will be described more in detail by way of examples with reference to the accompanying drawings.

Figure 1:
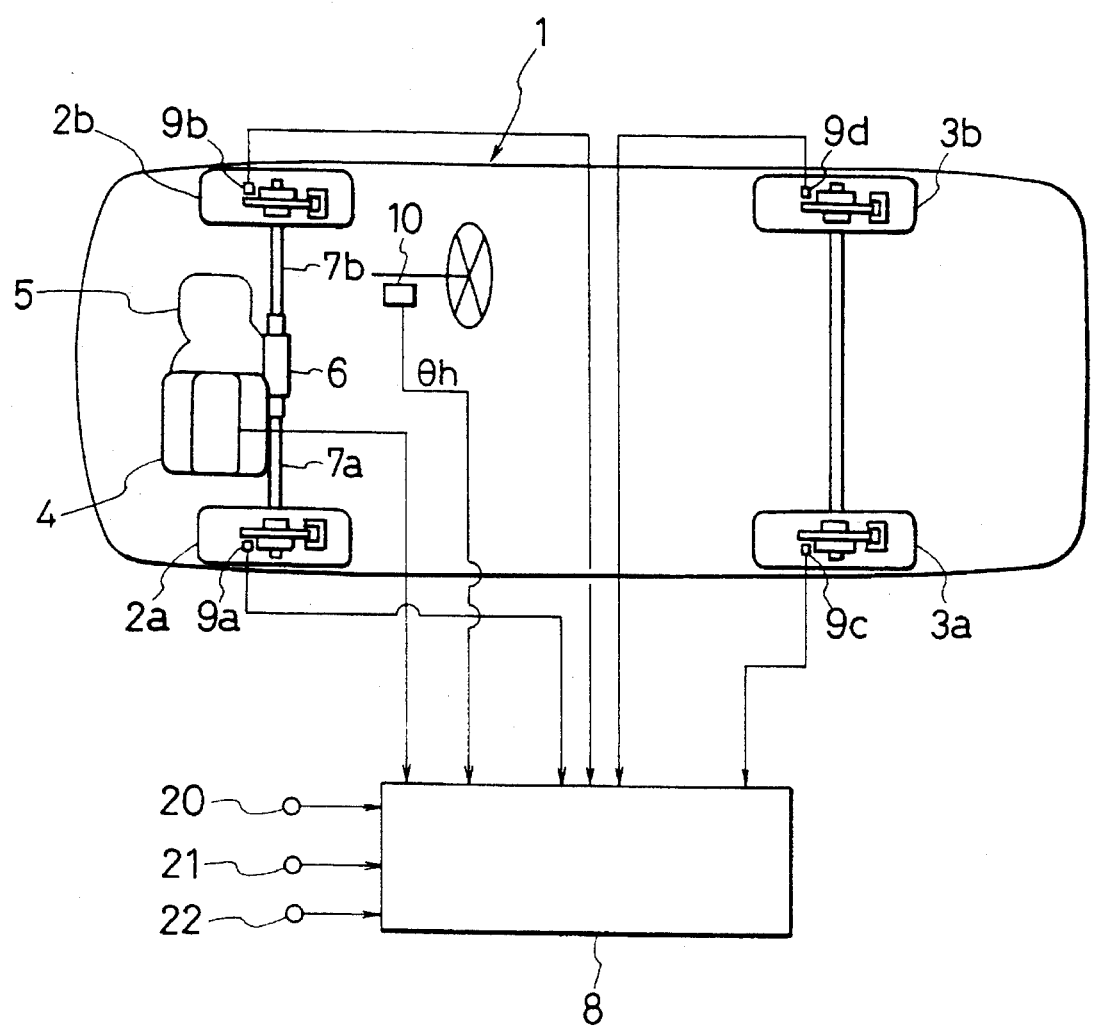
FIG. 1 is a schematic representation showing an overall configuration of an engine traction control system for an automotive vehicle according to the present invention.

As shown in FIG. 1, a vehicle body 1 is loaded at its front portion with a V type 6-cylinder engine 4 that is so arranged as to transmit its driving torque through an automatic transmission 5 and a differential 6 via a left driving shaft 7a to a left-hand front driving wheel 2a and via a right driving shaft 7b to a right-hand front driving wheel 2b. In FIG. 1, reference alphanumerals 3a and 3b denote left-hand and right-hand undriving rear wheels, respectively.

The vehicle body 1 is provided with a control system 8 for performing the control over injection of fuel and the timing of ignition for the internal combustion engine 4 as well as the control over the traction control for controlling the output of the engine 4 so as to make the slip amount of the vehicle body a target value. The control system 8 comprises an engine control section for executing the control over the injection of fuel from the engine and over the timing of ignition as well as an engine traction control section for executing the traction control of the engine.

To the vehicle body 1 are mounted sensors such as a sensor 20 for sensing an opening angle of a throttle valve of the engine 4, a sensor 21 for sensing a number of revolutions of the engine 4, a sensor 10 for sensing a steered angle of a steering wheel, a brake sensor 22 for sensing the braking status of each of the four wheels 2a, 2b, 3a and 3b, wheel speed sensors 9a, 9b, 9c and 9d for sensing the wheel speed of the respective four wheels 2a, 2b, 3a and 3b. Signals detected by the sensors are transmitted to the control system 8.

The control system 8 comprises an input interface for receiving the signals detected by the sensors, two microcomputers containing each a CPU, a ROM and a RAM, an output interface, and a drive circuit for an igniter and a fuel injector. The ROM of the microcomputer for the engine control section of the control system 8 stores a control program for controlling the injection of fuel and over the timing of ignition as well as an accompanying table or map, and the ROM of the microcomputer for the engine traction control section of the control system 8 stores a program and various tables and maps for performing the traction control of the engine as will be described hereinafter. The RAMs are provided with various memories, soft counters and so on.

A description will now be made of an outline of the traction control of the engine to be performed by the engine traction control section of the control system 8. There are computed an actual radius of cornering (Rr), a radius of cornering relative to a steered angle (Ri), a vehicle speed (V), a road surface friction coefficient ($\mu$), and a lateral acceleration (G) on the basis of the signals generated from the sensors. Further, a correction coefficient k is calculated on the basis of the lateral acceleration G so as to make a threshold value for deciding a slip of the vehicle body and a target control value lower as the lateral acceleration G becomes larger.

Then, the amount of the slip of the vehicle is computed, followed by making a decision on the basis of the slip amount to determine if the vehicle body is slipping. Further, a target control value T (a target value for the slip amount) is set and a control level FC is computed for adjusting the output of the internal combustion engine, thereby generating a control signal for controlling the traction control of the engine by performing the control over the injection of fuel and over the timing of ignition. In addition, the traction control of the engine according to the present invention has the features that the traction control of the engine for limiting the engine output is restrained by retarding the timing of ignition or cutting the supply of fuel to the partial number of the cylinders, when the engine 4 rotates at a given number of revolutions of the engine (for example, 6,500 rpm) or higher, in order to cause no damage against the engine 4 and the catalyst unit in the exhaust system.

Further, a description will be made of the traction control of the engine to be executed by the engine traction control section of the control system 8 with reference to the flow charts as shown in FIGS. 2 to 7.

The control is initiated as the engine 4 starts, followed by proceeding to step S1 at which the various signals from the sensors are read. Then, at step S2, the wheel speeds V2a and V2b of the respective front wheels 2a and 2b are computed on the basis of the output from the respective wheel speed sensors 9a and 9b as well as the wheel speeds V3a and V3b of the respective rear wheels 3a and 3b are computed on the basis of the output from the respective wheel speed sensors 9c and 9d. Further, there are computed the actual cornering radius Rr, the cornering radius Ri relative to the steered angle, the vehicle speed V, and the road surface friction coefficient $\mu$.

The actual cornering radius Rr can be computed on the basis of the wheel speeds V3a and V3b of the respective left and right undriving rear wheels 3a and 3b by equation (1) as follows:

$$Rr = Min(V3a, V3b) \times Td \div |V3a - V3b| + 0.5\ Td \qquad (1)$$

where Td is a tread (for example, 1.7 m); and Min(V3a, V3b) is the value V3a or V3b, whichever smaller.

The cornering radius Ri relative to the steered angle corresponds to approximately a radius of cornering at a neutral steering condition and it is computed on the basis of the absolute value of the steered angle $\theta h$ of the steering wheel, detected by the steered angle sensor 10, by correcting a linear form from a table as shown in Table 1 as follows:

TABLE 1

| $|\theta h|$ | Ri (m) | $|\theta h|$ | Ri (m) |
|---|---|---|---|
| 15° | 150 | 255° | 10 |
| 30° | 85 | 340° | 8 |
| 85° | 30 | 425° | 6 |
| 170° | 15 | 510° | 5 |

The vehicle speed V can be given as a value chosen from the wheel speed V3a or V3b of the respective undriving rear wheel 3a or 3b, whichever higher.

The road surface friction coefficient $\mu$ can be computed on the basis of the vehicle speed V and its acceleration Vg in a manner as will be described hereinafter. The acceleration Vg of the vehicle body can be computed by equation (2) below on the basis of a variation of the vehicle speed V at every 100 milliseconds over the period of time from the start of the control to 500 milliseconds at which the acceleration Vg of the vehicle body does not become large yet.

$$Vg = K1 \times [V(k) - V(k-100)] \qquad (2)$$

where K1 is a given coefficient;

V(k) is the vehicle speed V at the current time;

V(k−100) is the vehicle speed V before 100 milliseconds. Further, over the period of time exceeding 500 milliseconds at which the acceleration Vg of the vehicle body becomes sufficiently high, the acceleration Vg of the vehicle body can be computed by equation (3) as follows:

$$Vg = K2 \times [V(k) - V(k-500)] \qquad (3)$$

where K2 is a given coefficient;

V(k−500) is the vehicle speed V before 500 milliseconds; and

V(k) has the same meaning as above.

For the computation of the road surface friction coefficient μ, the period of time may be measured with a timer for counting 100 milliseconds and a timer for counting 500 milliseconds.

Further, the road surface friction coefficient μ is corrected in a three-dimensional fashion from Table 2 below on the basis of the vehicle speed V and the acceleration Vg of the vehicle body as given above.

TABLE 2

| | 0 → Vg → Higher | | | | | | | |
|---|---|---|---|---|---|---|---|---|
| 0 | 1.0 | 1.0 | 2.0 | 2.0 | 3.0 | 3.0 | 4.0 | 4.0 | 5.0 |
| ↓ | 1.0 | 1.0 | 2.0 | 2.0 | 3.0 | 4.0 | 4.0 | 5.0 | 5.0 |
| ↓ | 1.0 | 1.0 | 2.0 | 3.0 | 3.0 | 4.0 | 4.0 | 5.0 | 5.0 |
| V | 1.0 | 1.0 | 2.0 | 3.0 | 4.0 | 4.0 | 5.0 | 5.0 | 5.0 |
| (km) | 1.0 | 1.0 | 2.0 | 3.0 | 4.0 | 5.0 | 5.0 | 5.0 | 5.0 |
| ↓ | 1.0 | 1.0 | 2.0 | 4.0 | 4.0 | 5.0 | 5.0 | 5.0 | 5.0 |
| ↓ | 1.0 | 2.0 | 3.0 | 4.0 | 5.0 | 5.0 | 5.0 | 5.0 | 5.0 |
| Higher | 1.0 | 2.0 | 3.0 | 5.0 | 5.0 | 5.0 | 5.0 | 5.0 | 5.0 |

Then, at step S3, there are computed the lateral acceleration G and the correction coefficient k for the lateral acceleration G. The routine for computing the lateral acceleration G and the correction coefficient k for the lateral acceleration G will be described with reference to the flow chart as shown in FIG. 3.

Although the lateral acceleration G can be determined on the basis of the radius of cornering and the vehicle speed V, the lateral acceleration in this example is determined by choosing the actual cornering radius Rr or the cornering radius Ri relative to the steered angle. In order to determine the lateral acceleration G, it is decided to determine whether the extent of tendency to which the vehicle deviates from its running line on which the vehicle is cornering at the cornering radius Ri relative to the steered angle is large on the basis of the state of the surface of a road or the status of running. When it is decided that the extent of tendency is large, the lateral acceleration G is determined by choosing the cornering radius Ri relative to the steered angle. On the other hand, when it is decided that the extent of tendency is not large, the lateral acceleration G is determined by choosing the actual cornering radius Rr.

Figure 3:
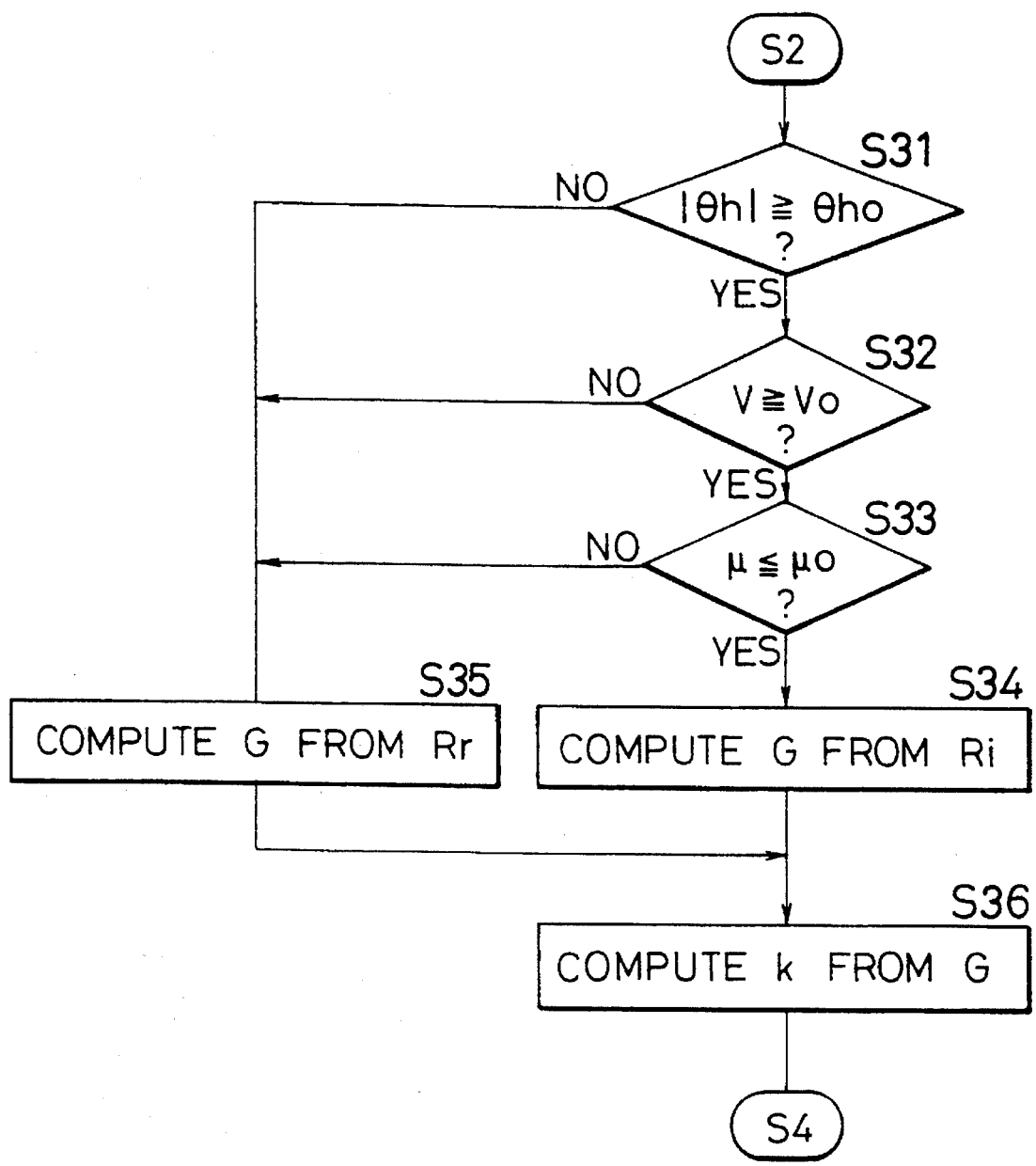
FIG. 3 is a flow chart showing a routine for step S3 in FIG. 2.

Specifically, in the flow chart as shown in FIG. 3, the lateral acceleration G is computed on the basis of the cornering radius Ri relative to the steered angle at step S34 when the absolute value of the steered angle θh is decided at step S31 to be equal to or higher than a given value θho, the vehicle speed V is decided at step S32 to be equal to or higher than a given value Vo, and the road surface friction coefficient μ is decided at step S33 to be equal to or higher than a given value μo. On the other hand, the lateral acceleration G is computed on the basis of the actual cornering radius Rr at step S35 when the absolute value of the steered angle θh is decided at step S31 to be smaller than the given value θho, the vehicle speed V is decided at step S32 to be smaller than the given value Vo, or the road surface friction coefficient μ is decided at step S33 to be smaller than the given value μo.

More specifically, the lateral acceleration G is computed on the basis of the actual cornering radius Rr or the cornering radius Ri relative to the steered angle by equation as follows:

$$G = V \times V \times 1/R \times 1/127 \qquad (4)$$

where V is the vehicle speed; and

R is Rr or Ri.

After the lateral acceleration G has been computed at step S34 or S35, the correction coefficient k is set at step S36 from a correction coefficient table as shown in Table 3 below.

TABLE 3

| Lateral Acceleration G | Correction Coefficient k |
|---|---|
| 0 | 1 |
| 0.1 | 0.9 |
| 0.3 | 0.8 |
| 0.5 | 0.7 |
| 0.7 | 0.6 |
| 0.9 | 0.5 |
| 1.0 | 0 |

Then, a threshold value for deciding a slip is set at step S4 in FIG. 2 by equation as follows:

Threshold value=Basic threshold value × correction coefficient k The basic threshold value is computed on the basis of the vehicle speed V and the road surface friction coefficient μ as parameters by making a correction on the basis of Table 4 (for the start of the traction control of the engine) or Table 5 (for the continuation of the traction control of the engine) in a three-dimensional fashion. The Table 4 is so arranged as to decide if the traction control of the engine is to be started and the Table 5 is so arranged as to decide if the traction control of the engine is to be continued.

TABLE 4

| | | 0 → V → Higher | | | | | |
|---|---|---|---|---|---|---|---|
| μ | 1 | +10 | +9 | +7 | +6 | +5 | +4 |
| | 2 | +11 | +10 | +9 | +8 | +7 | +6 |
| | 3 | +12 | +11 | +10 | +9 | +8 | +7 |
| | 4 | +13 | +12 | +11 | +10 | +9 | +8 |
| | 5 | +14 | +13 | +12 | +11 | +10 | +9 |

TABLE 5

| | | 0 → V → Higher | | | | | |
|---|---|---|---|---|---|---|---|
| μ | 1 | +3 | +3 | +2 | +2 | +1 | +1 |
| | 2 | +4 | +4 | +3 | +3 | +2 | +2 |
| | 3 | +5 | +5 | +4 | +4 | +3 | ± |
| | 4 | +6 | +6 | +5 | +5 | +4 | +4 |
| | 5 | +7 | +7 | +6 | +6 | +5 | +5 |

Figure 4:
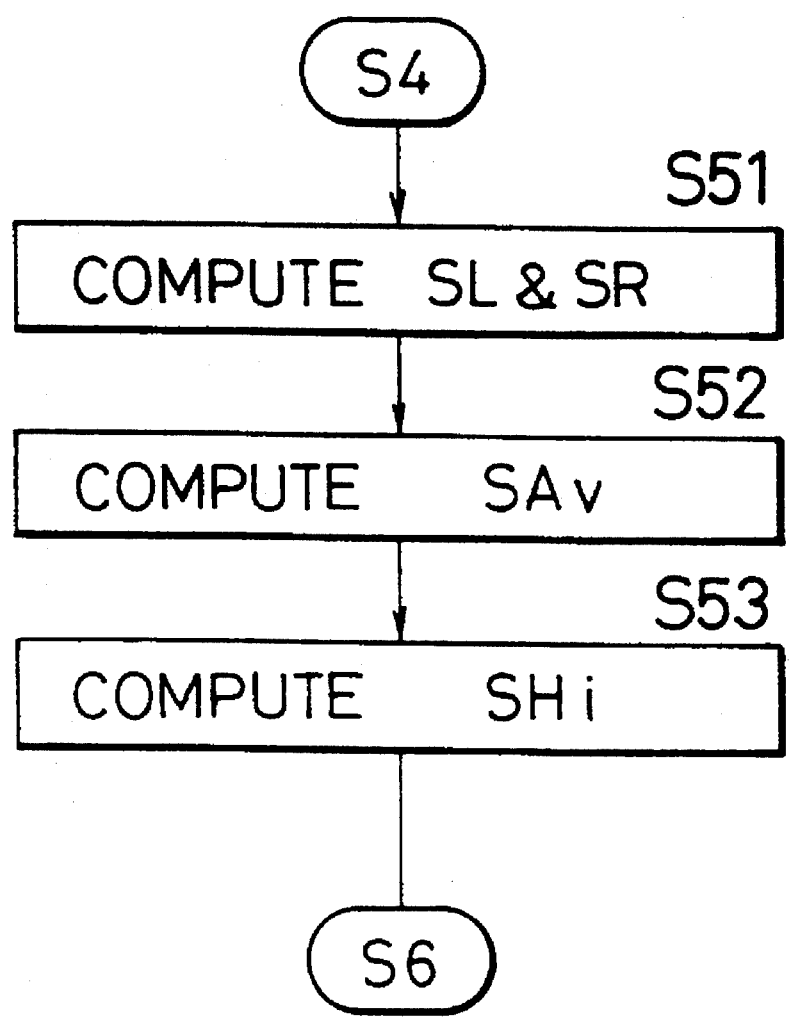
FIG. 4 is a flow chart showing a routine for step S5 in FIG. 2.

Then, the program flow goes to step S5 at which the amount of the slip is computed. A description will now be made of the computation of the slip amount with reference to the flow chart as shown in FIG. 4. First, at step S51, an actual slip amount SL for the left-hand front wheel 2a is computed by subtracting the vehicle speed V from the wheel speed V2a of the left-hand front wheel 2a and an actual slip amount SR for the right-hand front wheel 2b is computed by subtracting the vehicle speed V from the wheel speed V2b of the right-hand front wheel 2b. Then, at step S52, an average slip amount SAv is computed by averaging the slip amounts SL and SR of the left-hand and right-hand front wheels 2a and 2b, respectively, followed by proceeding to step S53 at which a maximum slip amount SHi is computed from the slip amount SL or SR, whichever higher.

Thereafter, at step S6, a slip decision is executed by deciding that the traction control of the engine is required to be performed when the maximum slip amount SHi is equal to or higher than the threshold value for deciding the slip and then by setting a slip flag SFL to 1.

Figure 2:
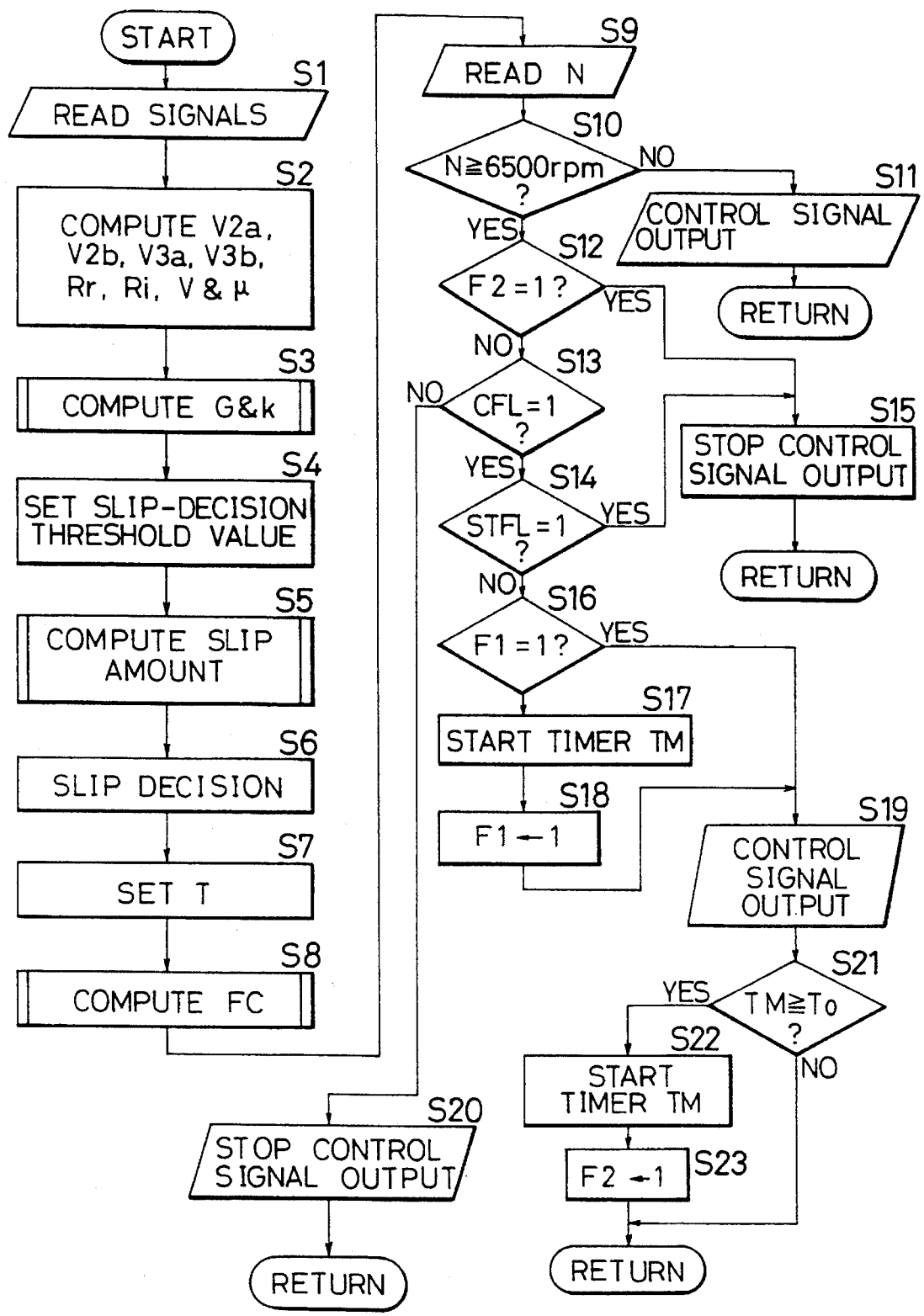
FIG. 2 is a flow chart showing a routine for the engine traction control.
Figure 5:
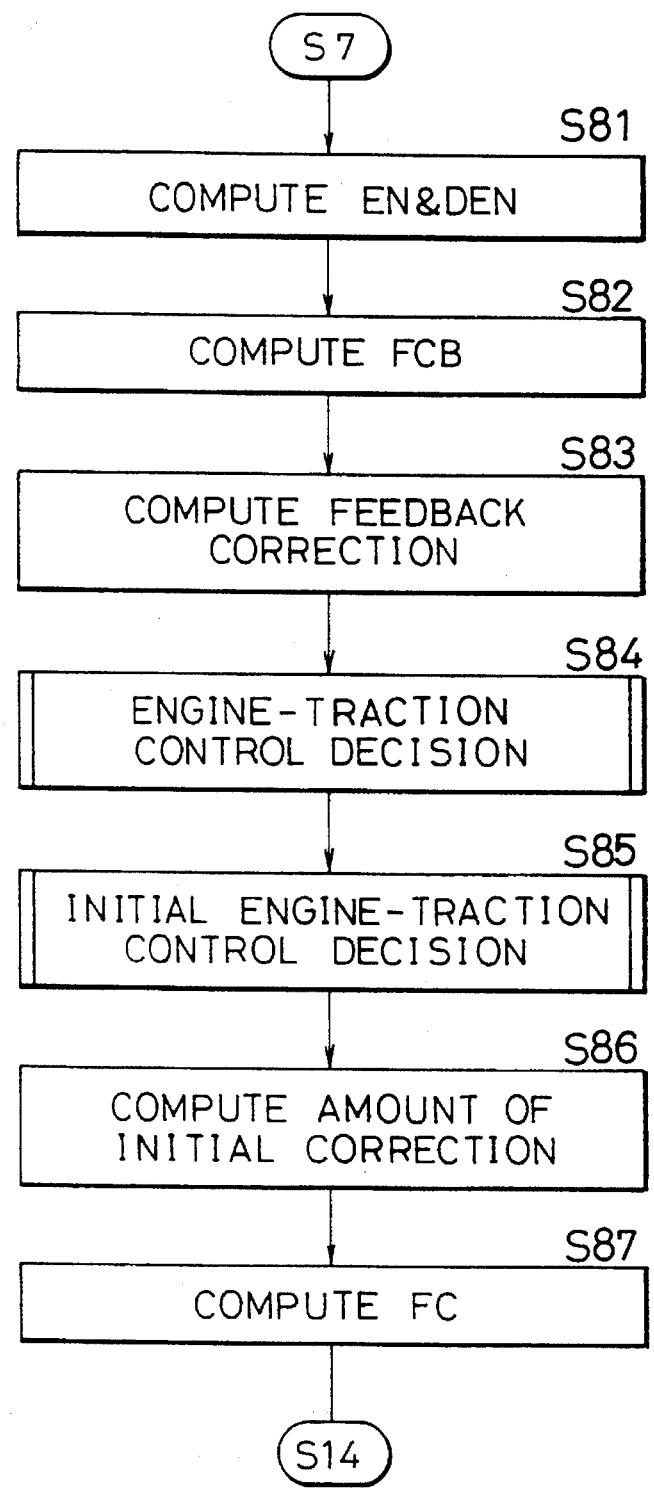
FIG. 5 is a flow chart showing a routine for step S8 in FIG. 2.

In this instance, there is used, as the threshold value for performing the slip decision, the basic threshold value for the start of the traction control, as shown in Table 4 above, when it is decided at step S84 in FIG. 5 indicating the routine of step S8 in FIG. 2 that the traction control of the engine is not in progress (CFL=0), on the one hand, and the basic threshold value for the continuation of the traction control, as shown in Table 5 above, when it is decided at step S84 in FIG. 5 that the traction control of the engine is in progress (CFL=1), on the other hand.

After the slip decision at step S6, then the program flow goes to step S7 at which the target control value T is set. The target control value T is set as a target value for the slip amount of each of the left-hand front wheel 2a and the right-hand front wheel 2b. Specifically, the target control value T is computed by choosing a basic target control value from a basic target control values table as shown in Table 6 below on the basis of the vehicle speed V and the road surface friction coefficient p used as parameters, and correcting the resulting basic target control value in a three-dimensional fashion by multiplying it with the correction coefficient k.

TABLE 6

| | | 0 → V → Higher | | | | |
|---|---|---|---|---|---|---|
| μ | 1 | +5.0 | +4.0 | +3.0 | +3.0 | +3.0 | +3.0 |
| | 2 | +5.0 | +4.0 | +4.0 | +3.0 | +3.0 | +3.0 |
| | 3 | +5.0 | +4.0 | +4.0 | +4.0 | +3.0 | +3.0 |
| | 4 | +6.0 | +5.0 | +5.0 | +4.0 | +4.0 | +4.0 |
| | 5 | +6.0 | +5.0 | +5.0 | +5.0 | +4.0 | +4.0 |

After the target control value T has been set at step S7, the program flow goes to step S8 and the control level FC is computed. The control level FC is so set as to exist in the range from 0 to 15 by deciding a basic control level FCB on the basis of a deviation value EN from the target control value T for the average slip amount SAv and its deviation change rate DEN and correcting the basic control level FCB with a feedback correction value of the previous value FC(K−1) and an initial correction value.

Specifically, the computation of the control level FC in the routine of step S8 will be described with reference to FIG. 5. First, at step S81, the deviation value EN and its deviation change rate DEN are computed. More specifically, the deviation value EN is computed by subtracting the target control value T from the current average slip amount SAv(K). Further, the deviation change rate DEN is computed by the following equation:

$$DEN = DSAv = SAv(K) - SAv(K-1)$$

where

DSAv is an average slip amount change rate;

SAv(K) is a current average slip amount; and

SAv(K−1) is a previous average slip amount. In other words, the deviation change rate DEN is computed by subtracting the previous average slip amount SAv(K−1) from the current average slip amount SAv(K).

Then, at step S82, the basic control level (FCB) is computed on the basis of the deviation value EN and its deviation change rate DEN from a basic control level table as shown in Table 7 below.

TABLE 7

| | DEN (g) −← 0 →+ | | | | | | |
|---|---|---|---|---|---|---|---|
| EN(Km/h) | −3 | −2 | −1 | −1 | 0 | +1 | +1 |
| − | −3 | −1 | −1 | 0 | 0 | +1 | +1 |
| ↑ | −2 | −1 | −1 | 0 | 0 | +1 | +1 |
| ↑ | −2 | −1 | 0 | 0 | +1 | +1 | +1 |
| 0 | −2 | −1 | 0 | 0 | +1 | +1 | +2 |
| ↓ | −1 | −1 | 0 | 0 | +1 | +1 | +2 |
| ↓ | −1 | 0 | 0 | +1 | +1 | +1 | +2 |
| Higher | −1 | 0 | 0 | +1 | +1 | +1 | ∓ |
| | −1 | 0 | 0 | +1 | +1 | +2 | ∓ |

Then, at step S83, the feedback correction is performed by adding the previous control level FC(K−1) to the current control level FC(K), followed by proceeding to step S84 at which the engine traction control decision is executed and then to step S85 at which the initial traction control decision is executed. Then, at step S86, an initial correction amount is computed in order to forcibly maintain the control level at a high level over the period extending from the time when it was decided for the first time that the front wheels 2a and 2b slip to the time when the initial traction control decision is renewed or released.

Figure 6:
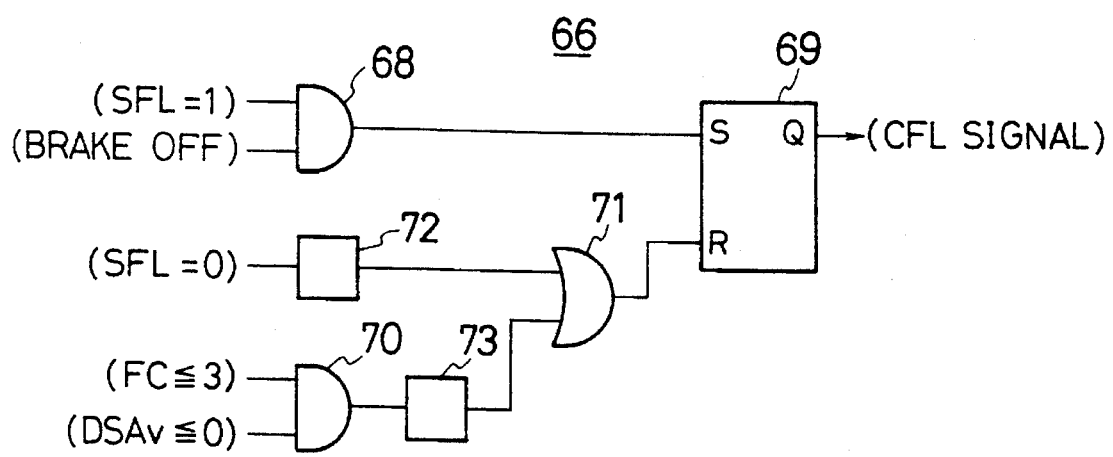
FIG. 6 is a diagram showing equivalent circuit for step S84 in FIG. 5.

The equivalent circuit for the engine traction control decision to be executed at step S84 is shown in FIG. 6. In the equivalent circuit as shown in FIG. 6, an AND circuit 68 is so arranged as to generate a set signal to a flip-flop 69 when the slip flag SFL=1 and when the wheels are not braked; an AND circuit 70 is so arranged as to generate a signal "1" when the control level FC is equal to or smaller than 3 and when the average slip amount change rate DSAv is equal to or smaller than "0" or it is set to a value corresponding to 0.3 G (where G is gravitational acceleration); and an OR circuit 71 is so arranged as to generate a reset signal to the flip-flop 69 when a signal indicative of the slip flag SFL=0 has been received continually for 1,000 milliseconds through a counter 72 or when an output signal indicative of "1" from the AND circuit 70 is received continually for 500 milliseconds through a counter 73. The flip-flop 69 is so adapted as to generate a signal indicative of a control flag CFL=1 (the engine traction control in progress) in response to a set signal.

Figure 7:
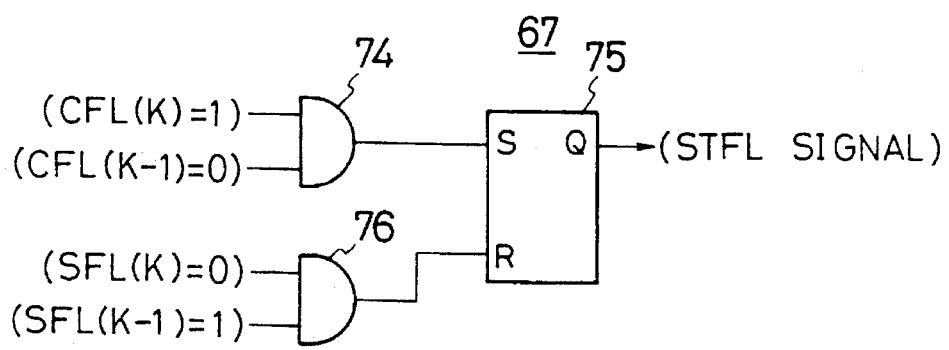
FIG. 7 is a diagram showing equivalent circuit for step S85 in FIG. 5.

FIG. 7 shows the equivalent circuit for the initial engine traction control decision to be executed at step S85. The equivalent circuit as shown in FIG. 7 comprises an AND circuit 74 so arranged as to generate a set signal to a flip-flop 75, when the current control flag CFL(K) is set to "1" and the previous control flag CFL(K−1) is set to "0", and an AND circuit 76 so arranged as to generate a reset signal to the flip-flop 75, when the current control flag CFL(K) is set to "0" and the previous control flag CFL(K−1) is set to "1". The flip-flop 75 is so arranged as to generate a signal indicative of an initial flag STFL=1 (the initial engine traction control in progress) in response to the set signal.

Then, at step S86, the initial correction amount is decided to be +2 when the initial flag STFL is set to "1" and the average slip amount change rate DSAv is decided to be smaller than "0" on the basis of the signal indicative of the initial flag STFL and the average slip amount change rate DSAv. The program flow then goes to step S87 at which the resulting initial correction amount is added to the feedback-corrected control level FC to thereby give a final control level FC, followed by proceeding to step S9.

Figure 8:
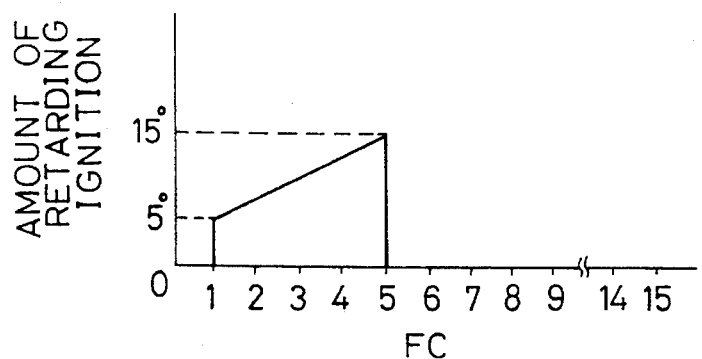
FIG. 8 is a map diagram showing an amount of retarding the timing of ignition with respect to a control level.
Figure 9:
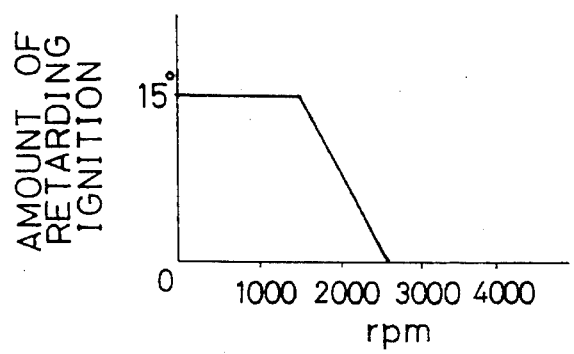
FIG. 9 is a map diagram showing an amount of retarding the timing of ignition with respect to the number of revolutions of the engine.

After step S8, the program flow goes to step S9 at which the number of engine revolutions N detected by the rpm sensor 21 is read, followed by proceeding to step S10 at which it is decided to determine if the number of engine revolutions N is equal to or higher than 6,500 rpm. When the result of the decision at step S10 indicates that the number of engine revolutions N is smaller than 6,500 rpm, then the program flow goes to step S11 at which a control signal is generated from the engine traction control section to the engine control section. The control signal comprises a control signal indicative of the retarding of the timing of ignition and a control signal indicative of the cut of fuel. The control signal indicative of the timing of ignition is generated after the amount of retarding the timing of ignition is decided so as to comply with the control level on the basis of the map as shown in FIG. 8. In this case, the maximum amount of retarding the timing of ignition is restricted on the basis of a map as shown in FIG. 9 in a region in which the number of revolutions of the engine is high.

Figure 10:
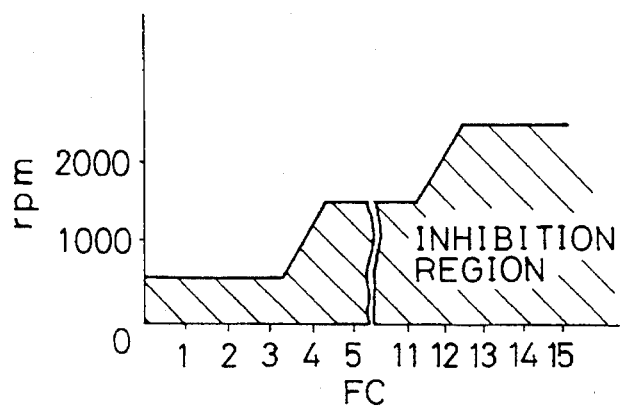
FIG. 10 is a map diagram showing an inhibition region for inhibiting the fuel cut with respect to the control level and the number of revolutions of the engine.

On the other hand, the signal indicative of the cut of fuel is generated by singling out a fuel cut pattern as indicated in Table 8 below by the numeral "0" to "12", inclusive, on the basis of the control level FC. In Table 8 below, it is to be noted that the pattern number is indicated so as to become larger as the control level becomes higher and that the sign "X" denotes the cut of fuel. In this case, a condition of inhibiting the cut of fuel is provided for each of the control levels as shown in FIG. 10 so as to restrict the cut of fuel in a region where the number of revolutions of the engine is low.

fuel injector valve #2 and the second fuel injector valve #8; the third cylinder C3 has the first fuel injector valve #3 and the second fuel injector valve #9; the fourth cylinder C4 has the first fuel injector valve #4 and the second fuel injector valve #10; the fifth cylinder C5 has the first fuel injector valve #5 and the second fuel injector valve #11; and the sixth cylinder C6 has the first fuel injector valve #6 and the second fuel injector valve #12. In the Remarks section in Table 8 above, the expression "Cut" is intended to mean that the injection of fuel from the first and second fuel injector valves to the corresponding fuel injector valves of a particular cylinder is cut and the expression "Thinning" is intended to mean that fuel is injected from one of the first and second fuel injector valves of a particular cylinder while the injection of fuel from the other to the particular cylinder is cut.

The processes at steps S9, S10 and S12–S23 are performed to restrain the traction control for restricting the output of the engine when the number of revolutions of the engine is equal to or higher than 6,500 rpm. More specifically, the number of engine revolutions N detected by the rpm sensor 21 is read at step S9, followed by proceeding to step S10 at which it is decided to determine if the number of engine revolutions N is equal to or higher than 6,500 rpm and then proceeding to step S12 when the result of the decision at step S10 indicates that the number of engine revolutions N is equal to or higher than 6,500 rpm. At step S12, it is decided to determine if a flag F2 is set to "1". As the flag F2 is set at step S23, it is initially in a reset state so that the program flow goes to step S13.

Then, at step S13, it is decided to determine if the control flag CFL is set to "1", followed by proceeding to step S14 when it is decided at step S13 that the control flag CFL is set to "1". At step S14, it is decided to determine if the initial flag STFL is set to "1". When the result of the decision at step S14 indicates that the initial flag STFL is set to "1", then the program flow goes to step S15 at which the output of the control signal for the traction control to the engine control

TABLE 8

| | | FUEL INJECTOR NO. | | | | | | | | | | | | |
|---|---|---|---|---|---|---|---|---|---|---|---|---|---|---|
| | FC | 1 | 2 | 3 | 4 | 5 | 6 | 7 | 8 | 9 | 10 | 11 | 12 | REMARKS |
| PATTERN | 0 | X | | | | | | | | | | | | Injected to all cylinders |
| | 1 | X | | | | | | | | | | | | Thinning one cylinder out |
| | 2 | X | | | | | | X | | | | | | Cut one cylinder |
| | 3 | X | | | X | | | X | | | | | | |
| | 4 | X | | | X | | | X | | | X | | | Cut two cylinders |
| | 5 | X | X | | X | | | X | | | X | | | |
| | 6 | X | X | | X | | | X | X | | X | | | Cut three cylinders (in the one bank) |
| | 7 | X | X | | X | X | | X | X | | X | | | |
| | 8 | X | X | | X | X | | X | X | | X | X | | Cut four cylinders |
| | 9 | X | X | X | X | X | | X | X | | X | X | | |
| | 10 | X | X | X | X | X | | X | X | X | X | X | | Cut five cylinders |
| | 11 | X | X | X | X | X | X | X | X | X | X | | | |
| | 12 | X | X | X | X | X | X | X | X | X | X | X | X | Cut all cylinders |

An additional description will now be made of the Table 8 above by indicating the three cylinders in the left-hand bank of the V type 6-cylinder engine by reference alphanumerals C1, C3 and C5 and the three cylinders in the right-hand bank thereof by reference alphanumerals C2, C4 and C6. Each of the cylinders has a first fuel injector valve and a second fuel injector valve. More specifically, the first cylinder C1 has the first fuel injector valve #1 and the second fuel injector valve #7; the second cylinder C2 has the first section is inhibited, followed by the return of the program flow. In other words, the start of the traction control is inhibited in such a state that the number of engine revolutions N is equal to or higher than 6,500 rpm.

On the other hand, when the control flag CFL is set and the initial flag STFL is reset, that is, when it is decided at step S13 that the control flag CFL is set to "1" and at step S14 that the initial flag STFL is not set to "1" (i.e. when the traction control is being executed), then the program flow goes to step S16 at which a decision is made about a flag F1 in order to determine if a timer TM is working (in this example, a timer count is also indicated by symbol "TM"). When the timer TM is reset, that is, when it is decided at step S16 that the flag F1 is not set to "1", then the program flow goes to step S17 at which the timer TM is allowed to start, followed by proceeding to step S18 at which the flag F1 is set to "1".

In other words, when the number of engine revolutions N is equal to or higher than 6,500 rpm during the traction control, the timer TM is allowed to start at step S17 and the flag F1 is set to "1", followed by proceeding to step S19 at which the engine control section is supplied with the control signal indicative of the inhibition of retarding the timing of ignition and a control signal indicative of the repetition of the cutting of the supply of fuel to the entire cylinders and the resuming of the supply of fuel to the entire cylinders.

Then, at step S21, it is decided to determine if the count value TM of the timer TM is equal to or higher than a given value T0. When the decision at step S21 gives the negative result, then the program flow 22 is returned.

When the timer TM is allowed to start, that is, when it is decided at step S16 that the flag F1 is set to "1", then the program flow goes from step S16 to step S19. When the processes at step S16 and at step S19 are repeated for a given period of time, then the decision at step S21 gives the affirmative result that the count value TM of the timer TM is equal to or higher than the given value T0, followed by proceeding to step S22 at which the timer TM is reset and then proceeding to step S23 at which a flag F2 is set to "1". Thereafter, the program flow is shifted from step 12 to step 15 at which the output of the control signal for performing the traction control to the engine control section is inhibited, followed by the return of the program flow.

Furthermore, even if the given period of time would not elapse after the start of the timer TM, the program flow goes from step S13 to step S20 when one traction control is terminated and the control flag CFL is reset. Then, at step 20, the output of the control signal is suspended, followed by the return of the program flow.

Figure 11:
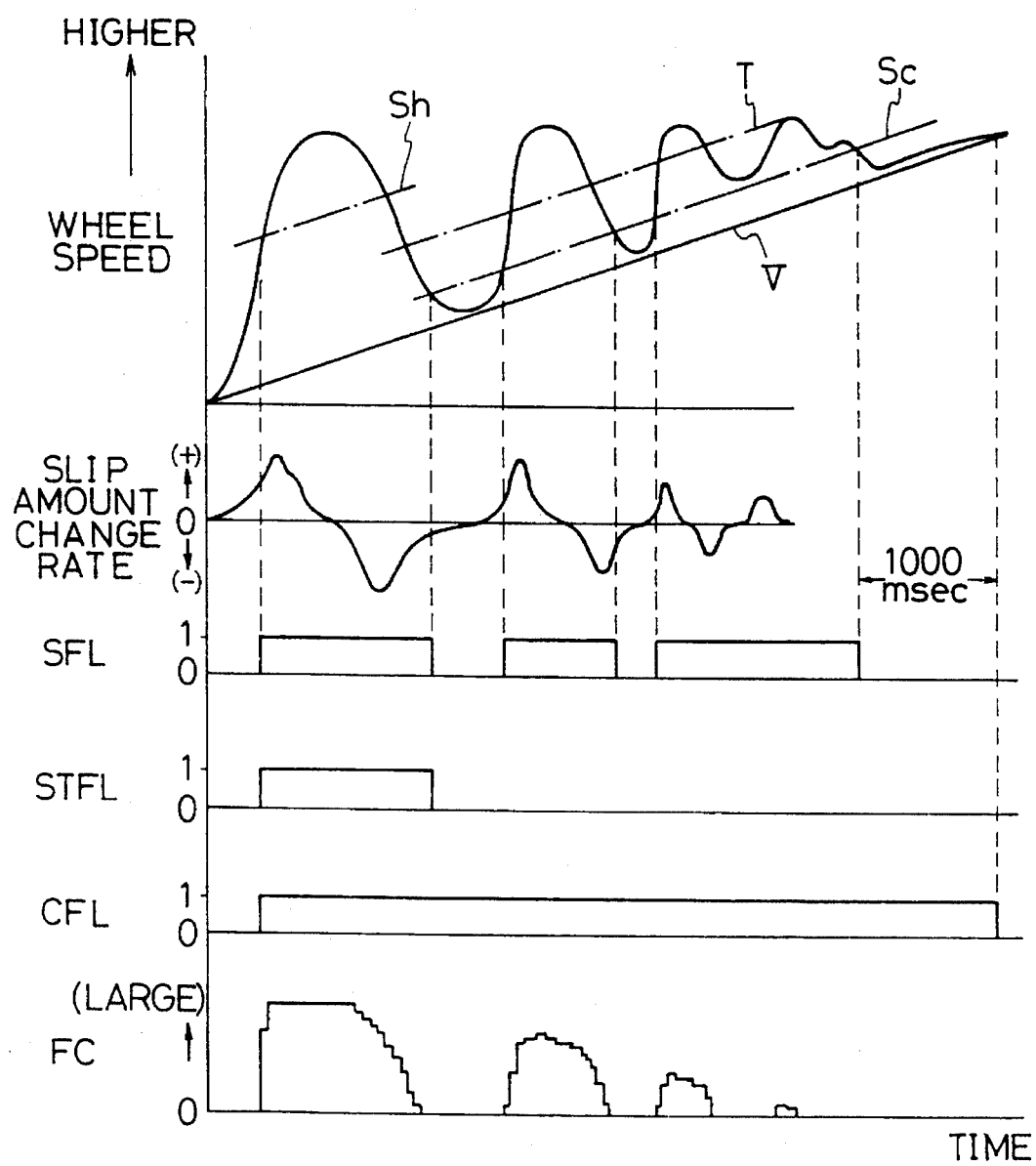
FIG. 11 is a time chart showing an operation of the engine traction control.

Now, a description will be made of the action of the traction control of the engine with reference to the time chart as shown in FIG. 11.

The basic value of the start threshold value Sh for starting the traction control of the engine from the non-control state is computed from the Table 4 above and the threshold value Sh is set as a relatively high threshold value. Hence, even if the wheel speed of the driving wheel becomes high (the maximum slip amount SHi becomes high) due to disturbances or for other reasons, the slip flag SFL is not set as long as the wheel speed of the driving wheel does not exceed the start threshold value Sh, and the traction control of the engine does not start. If the wheel speed of the driving wheel exceeds the start threshold value Sh, on the other hand, the slip flag SFL is set as well as the control flag CFL and the initial flag STFL are set if the wheels are not braked, followed by the start of the traction control of the engine.

Further, when it is decided from the steered angle θh and the road surface friction coefficient μ that the extent of tendency of deviating the vehicle body from its running line when the vehicle is cornering at the cornering radius Ri relative to the steered angle is large, that is, for example, the extent of tendency of understeering is large, then the lateral acceleration G of the vehicle body can be computed on the basis of the cornering radius Ri relative to the steered angle. In this case, the cornering radius Ri relative to the steered angle is smaller than the actual cornering radius Rr so that the lateral acceleration G becomes larger and the correction coefficient k becomes smaller; hence, the start threshold value Sh for the start of the traction of the engine becomes low.

Thus, even if the amount of the slip itself is not so large, the traction control of the engine can be allowed to start at an early timing, thereby enabling an excessive extent of understeering tendency to be suppressed from occurring due to a decrease in the drive torque for driving the driving wheels at an early timing.

The timing of ignition and the injection of fuel are restricted in accordance with the control level FC. As described hereinabove, the control level FC is in turn obtained by determining the basic control level FCB on the basis of the deviation value EN from the target control value T of the average slip amount SAv and the deviation change rate DEN and then correcting the basic control level FCB with the feedback correction value and the initial correction value.

Although the initial correction value can always be set to +2, the initial correction value can be set to +5 until the average slip amount change rate DSAv becomes "0" for the first time and then shifted to +2 until the initial flag STFL becomes "0" thereafter. The control amount can forcibly be made larger by correction with the initial correction value, thereby allowing the slip to be converged at an early timing.

The timing at which the initial flag STFL becomes "0" is the point of time when the maximum slip amount SHi becomes equal to or smaller than the threshold value Sc for deciding the continuation of the traction control of the engine. Hence, as the correction coefficient k becomes smaller when it is decided that the extent of tendency of the vehicle body deviating from its running line is great when the vehicle is cornering at the cornering radius Ri relative to the steered angle, the target control value T becomes smaller. Hence, the understeering tendency can be removed at an early timing because the amount of reducing the driving torque for driving the driving wheels can be made greater due to a decrease of the slip amount up to the target value.

The threshold value Sc for deciding the continuation of the traction control of the engine in turn is obtained by computing its basic value from the Table 5 above and it is set as a relatively lower value. When the extent of tendency of deviating the vehicle body from its cornering line at the cornering radius Ri relative to the steered angle is great, the correction coefficient k becomes smaller, thereby further lowering the threshold value Sc and consequently enabling the control to be continued until the slip is converged.

On the other hand, when the extent of tendency of deviating the vehicle body from its cornering line having the cornering radius Ri relative to the steered angle is not large, the lateral acceleration G is computed on the basis of the actual cornering radius Rr, thereby allowing the threshold value for making a decision of the slip and the target control value T to be corrected with high accuracy.

Even if a situation would occur that the higher wheel speed of the driving wheel becomes equal to or smaller than the threshold value Sc for deciding the continuation of the traction control of the engine, the control flag CFL is so arranged as to be kept in its set state as long as the such situation does not last for 1 second or longer. Further, when the wheel speeds of the driving wheels are increased again as the amount of reducing the driving torque for driving the driving wheels is caused to decrease, the slip flag SFL is set again to thereby continue the control. In this case, the initial flag STFL is not set and the control level FC is not corrected; hence, the control level FC can be set in an initial stage only by the basic control level on the basis of the deviation value EN and its deviation change rate DEN and thereafter by the control level FC obtained by subjecting the basic control level to feedback correction with the previous value. Then, the slip is allowed to converge and, when the state in which the slip flag SFL is not set is continued over 1 second or longer, the control flag CFL is shifted to "0" and the traction control of the engine is terminated.

If the ignition would be retarded in such a state that the number of revolutions of the engine is high, a large amount of unburned gases is caused to burn in the catalyst unit disposed in the exhaust system, thereby damaging the catalyst unit. On the other hand, when the supply of fuel to the partial number of the cylinders is cut at the time when the engine rotates at a high number of engine revolutions, the concentration of oxygen in exhaust gases becomes so high that the burning in the catalyst unit is activated and the catalyst unit may be damaged.

In order to prevent the concentration of oxygen in exhaust gases from becoming high to such an extent to which the catalyst unit is damaged, the traction control of the engine for restricting the engine output is so arranged as not to start by executing the processes at steps S14 and S15, when the number of engine revolutions N becomes equal to or higher than 6,500 rpm.

On the other hand, when the number of engine revolutions N becomes equal to or higher than 6,500 rpm during the traction control, the action to retard the timing of ignition is inhibited and the cut of the supply of fuel to all the cylinders and the resumption of the supply thereof to all the cylinders are repeatedly executed for a given period of time. When the traction control is terminated (i.e. when the control flag CFL is reset) during the inhibition of retarding the timing of ignition and the repetitive execution of cutting the supply of fuel to all the cylinders and resuming the supply of fuel to all the cylinders, the output of the control signal is suspended.

By inhibiting the retarding of the timing of ignition and repeatedly executing the cut of the supply of fuel to all the cylinders and the resumption of the supply of fuel to all the cylinders for the given period of time without immediately suspending the traction control in the manner as described hereinabove, the slip can be suppressed and the catalyst unit can be protected while preventing the number of revolutions of the engine 4 from temporarily becoming very high rapidly, thereby preventing stability in maneuvering from reducing due to rapid changes of the output of the engine.

It can further be noted that the amount of the slip can be set in any conventional manner, for example, by a ratio of the wheel speed of the driving wheel to the vehicle speed V.

It is to be understood that the foregoing text and drawings relate to embodiments of the present invention given by way of examples but not limitation. Various other embodiments and variants are possible within the spirit and scope of the present invention.

What is claimed is:

1. A slip control system for an automotive vehicle, comprising:

a slip amount detecting means for detecting an amount of a slip of a driving wheel with respect to the surface of a road;

an ignition timing adjusting means for adjusting a timing of ignition of an internal combustion engine;

a rpm detecting means for detecting a number of revolutions of the engine;

an ignition timing control means for controlling said ignition timing adjusting means by retarding the timing of ignition of the engine to thereby prevent the slip amount detected by said slip amount detecting means from becoming excessive; and an inhibition means for inhibiting the timing of the ignition from being retarded by said ignition timing control means at the time when the number of revolutions of the engine detected by said rpm detecting means is equal to or higher than a given number of revolutions of the engine.

2. A slip control system as claimed in claim 1, further comprising a control altering means for altering an extent of control by said ignition timing control means in accordance with lateral acceleration acting upon a body of the vehicle.

3. A slip control system as claimed in claim 2, wherein said control altering means is so adapted as to perform at least one of an action to alleviate a condition for starting the control by said ignition timing control means to a lower extent and an action to alter an amount of control by said ignition timing control means so as to make an extent greater, to which the output of the engine is reduced, as the lateral acceleration becomes higher.

4. A slip control system as claimed in claim 3, wherein:

at least one of a first threshold value for deciding starting the control by said ignition timing control means, a second threshold value for deciding continuing the control by said ignition timing control means, and a target threshold value is set as compared with an amount of a slip to be detected by said slip amount detecting means; and said control altering means is so adapted as to alter at least one of said first threshold value, second threshold value and target threshold value.

5. A slip control system as claimed in claim 3, further comprising an assumption means for assuming whether a steering characteristic of the vehicle is changing into a direction in which an understeering tendency is becoming stronger than beforehand; and a correction means for correcting said lateral acceleration to a larger value when it is assumed by said assumption means that the understeering tendency is becoming stronger than beforehand.

6. A slip control system as claimed in claim 5, wherein said assumption means is so adapted as to make an assumption on the basis of a steered angle of a steering wheel, a vehicle speed and a road surface friction coefficient $\mu$ as parameters.

7. A slip control system as claimed in claim 1, wherein said inhibition means is so adapted as to inhibit control by said ignition timing control means from starting when the number of revolutions of the engine detected by said rpm detecting means is detected as being equal to or higher than said given number of revolutions of the engine, in a state in which no control by said ignition timing control means is performed.

8. A slip control system as claimed in claim 1, further comprising:

a means for making an amount of retarding the timing of ignition larger when the amount of the slip detected by said slip amount detecting means is large than when the amount of the slip detected thereby is small.

9. A slip control system as claimed in claim 1, wherein:

an upper limit value is set for the amount in which the timing of ignition is retarded by said ignition timing control means; and said upper limit value is so set as to become smaller as the number of revolutions of the engine becomes greater.

10. A slip control system as claimed in claim 1, wherein:

the exhaust system of the engine has a catalyst for purifying exhaust gases to be withdrawn from the engine;

said ignition timing;adjusting means is adapted to adjust a factor exerting an influence upon combustibility of the engine so as to increase unburned ingredients in exhaust gases withdrawn from the engine or so as to make a concentration of oxygen in the exhaust gases excessive, when the control by said ignition timing control means is performed; and said inhibition means is so adapted as to at least inhibit the control by said ignition timing control means and as to perform a particular control for preventing said catalyst from exceeding too high of a temperature by reducing the output of the engine.

11. A slip control system as claimed in claim 10, wherein:

said engine is an internal combustion engine having multiple cylinders; and said particular control is executed by repeating the action to suspend supply of fuel to all the cylinders and the action to supply fuel to all the cylinders.

12. A slip control system as claimed in claim 11, wherein said particular control is forcibly inhibited regardless of the number of revolutions of the engine after said particular control has been executed for a given period of time.

13. A slip control system as claimed in claim 11, wherein:

said ignition timing adjusting means comprises a first adjusting means for adjusting the timing of ignition and a second adjusting means for adjusting the supply of fuel to each of the cylinders discretely; and said ignition timing control means comprises a first control means and a second control means, said first control means being so adapted as to retard the timing of ignition by controlling said first adjusting means and said second control means being so adapted as to cut the supply of fuel to a partial number of the cylinders by controlling said second adjusting means.

14. A slip control system as claimed in claim 1, further comprising an initial correction means for making a decrease of the output of the engine temporarily greater at the time when the control by said ignition timing control means starts.

15. A slip control system for an automotive vehicle, comprising:

a slip amount detecting means for detecting an amount of a slip of a driving wheel with respect to the surface of a road;

an ignition timing adjusting means for adjusting a timing of ignition of an internal combustion engine having multiple cylinders;

a rpm detecting means for detecting a number of revolutions of the engine;

an ignition timing control means for controlling said ignition timing adjusting means by retarding the timing of ignition of the engine to thereby prevent the slip amount detected by said slip amount detecting means from becoming excessive, said ignition timing adjusting means comprising a first adjusting means for adjusting the timing of ignition and a second adjusting means for adjusting supply of fuel discretely to each of the multiple cylinders; and an inhibition means for inhibiting the timing of the ignition from being retarded by said ignition timing control means at the time when the number of revolutions of the engine detected by said rpm detecting means is equal to or higher than a given number of revolutions of the engine, said ignition timing control means comprising a first control means and a second control means, said first control means being so adapted as to reduce the output of the engine by retarding the timing of ignition for all cylinders of the engine by controlling said first adjusting means and said second control means being so adapted as to reduce the output of the engine by cutting supply of fuel to a partial number of the multiple cylinders thereof.

16. A slip control system as claimed in claim 15, wherein:

said inhibition means is so adapted as to inhibit control by both of said first control means and said second control means from starting when the number of revolutions of the engine detected by said rpm detecting means is detected as being equal to or higher than said given number of revolutions of the engine, in a state in which no control by said ignition timing control means is performed; and said inhibition means is so adapted as to perform a particular control for inhibiting the control by said first control means and said second control means and for protecting at least one of the engine and an exhaust system, when the number of revolutions of the engine detected by said rpm detecting means is detected as becoming equal to or higher than said given number of revolutions of the engine during the control by said ignition timing control means.

17. A slip control system as claimed in claim 16, wherein the number of cylinders to which supply of fuel is cut becomes greater when the amount of the slip detected by said slip amount detecting means is great than when the amount of the slip detected thereby is small.

18. A slip control system as claimed in claim 16, further comprising:

an inhibition means for inhibiting supply of fuel from being cut by said engine control means when the engine rotates at the number of revolutions of the engine equal to or smaller than a given value;

wherein said number of revolutions of the engine is so set as to become higher when the amount of the slip detected by said slip amount detecting means is great than when the amount of the slip detected thereby is small.

19. A slip control system as claimed in claim 16, wherein:

the exhaust system of the engine has a catalyst for purifying exhaust gases to be withdrawn from the engine; and said particular control is so performed as to prevent said catalyst from exceeding too high of a temperature and to reduce the output of the engine.

20. A slip control system as claimed in claim 19, wherein said particular control is performed by repeating an action to suspend the supply of fuel to all cylinders and an action to supply fuel to all cylinders.

21. A slip control system as claimed in claim 16, wherein said particular control is forcibly inhibited regardless of the number of revolutions of the engine after said particular control has been performed for a given period of time.

* * * * *